UNITED STATES PATENT OFFICE 2,602,780

HYDRAULIC FLUID

William A. Zisman, Washington, D. C., and John K. Wolfe, Bethesda, and Hayward R. Baker, Mount Rainier, Md., and Dwight R. Spessard, United States Navy No Drawing. Application August 17, 1945, Serial No. 611,219

5 Claims. (Cl. 252—73)

(Granted under the act of March 3, 1883, as amended April 30, 1928; 370 O. G. 757)

Our invention relates to hydraulic-fluid compositions for use in devices and systems for the transmission of mechanical energy by fluid pressure and to a method of preventing the deterioration of the fluid and the system.

A hydraulic fluid which is essentially an aqueous solution must have a freezing point low enough to avoid any possibility of the separation of solid phases within the system at any temperature to which the fluid may be exposed. In modern military operations, it is not unusual for hydraulic systems, for example, those in aircraft for operation of landing gear, to be exposed for long periods of time to temperatures as low as minus 60° to minus 70° F. Accordingly, it is a fundamental object of our invention to provide a hydraulic fluid having an extremely low freezing point to obviate the possibility of solid separation at very low temperatures.

Within any hydraulic system there will be found such metals as iron, brass, solder, bronze, aluminum, zinc, cadmium, and other more or less commonly used metals. The presence of several metals in a single hydraulic system presents the possibility of the formation of a large number of electrical couples within the system thereby providing ideal corrosion conditions. Accordingly, it is another important object of our invention to balance the hydraulic fluid composition so that all metals found within the hydraulic system will be adequately protected against corrosion.

Within the common hydraulic system, there is always at some point a reservoir for excess fluid. Such a reservoir is never full and, being a closed container, it will define a vapor space above the fluid contained therein. Even within the simplest of our hydraulic systems, humid corrosion within such a space presents a serious problem. In the more complex systems, found in military or commercial aircraft or in naval vessels where service conditions are extremely severe and the system is exceedingly complex, the corrosion problem is correspondingly more difficult. Parts are frequently machined to fine tolerances and the slightest corrosion changes dimensions and upsets operation. It is, therefore, a further object of the invention to provide hydraulic fluid compositions which will inhibit adequately both the humid and contact corrosion in the system.

A further object of the invention is to provide a hydraulic fluid composition to which the above properties have been imparted and which, in addition, possesses a temperature coefficient of viscosity low enough to make it a desirable hydraulic fluid.

In any military application, a property, in addition to those mentioned above, which a hydraulic fluid should have is that of non-inflammability and, accordingly, it is a further important object of the invention to provide a fluid which is substantially non-inflammable.

For the accomplishment of these and other objects of the invention, hydraulic compositions are prepared containing water, a soluble organic polymeric thickener, and a compound comprising a water-miscible freezing point depressant and are balanced with buffering agents, and corrosion inhibitors.

The water soluble polyhydric alcohols or ethers used as freezing point depressants may be any of the common glycols or glycol ethers having 2 to about 14 carbon atoms such as ethylene glycol, diethylene glycol, triethylene glycol, ethylene glycol ethers such as the ethyl, methyl, propyl, and butyl ethers thereof, and similar ethers of diethylene and triethylene glycol. In general we prefer to use the simpler compounds as represented by the polyhydric alcohols such as ethylene glycol, propylene glycol, butylene glycol, glycerine and diethylene glycol for they are easily obtainable and blend easily with water to give very low-freezing mixtures which form good bases for the fluid compositions. As the basis of the hydraulic fluid composition it is preferable to use proportions of water and polyhydric alcohol which will give in combination a very low freezing point for a given non-inflammable mixture.

The preferred, soluble organic polymeric thickener of the hydraulic fluids of our invention comprises a co-polymer of ethylene oxide and 1,2-propylene or 1,3-propylene oxide, preferably one containing more than 50 mole percent of ethylene oxide and less than 50 mole percent of the propylene oxide, co-polymerized to a thick fluid polymer having a molecular weight not in excess of 15,000 to 20,000. We have found that a thickener having the optimum water solubility, viscosity, shear strength, and other properties which we have indicated as being desirable in a hydraulic fluid composition, is made by copolymerizing about 75 mole percent of ethylene oxide and about 25 mole percent of isopropylene oxide to a molecular weight not in excess of about 15,000 to 20,000. The polymer thus formed has a very high molecular weight, about 12,000, and thickens the aqueous base to the desired viscosity when added in only small proportion. The higher molecular weight polymers are the more effective thickening agents. The polymers have a composition which can be indicated as follows:

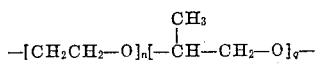

in which $n$ and $q$ are whole numbers, and $n/q$ is greater than 1, which, it is clear, is characterized by the frequent random recurrence of methyl group branches. When the molecular weight of a polymer approaches about 20,000, the figure begins to lose its significance and characterization of the polymer by some other property becomes desirable if not necessary. For our purposes the polymers can be characterized by their shear breakdown points by which we mean the load which will cause a compound of a certain molecular weight to be broken down by the shearing load to which it is subjected when placed between moving surfaces. Accordingly, we have found it best to use a polymer having a molecular weight not in excess of 15,000 to 20,000 to minimize shear breakdown in the system.

The inhibition of both humid and liquid phase, or contact, corrosion in the hydraulic system depends in large measure on the provision of a fluid of such composition that it will deposit on all surfaces within the hydraulic system a protective monomolecular film of adsorbed molecules. When this adsorption is sufficiently strong and involves the proper type of molecule, a hydrophobic film can be deposited throughout the system with the result that all parts, those wetted and those not wetted by the fluid, are equally well protected from corrosion.

It is generally accepted that polar molecules adsorb onto bare metal surfaces and, if the polar molecule which adsorbs onto the surface be properly selected, the force of adsorption can be very great. The nature of the outer face of the adsorbed monomolecular layer of the compound on the surface will be determined by the nature of the chemical groups carried by the adsorbent end of the molecule. The hydrocarbon group carried by the non-polar end of the molecule will present a uniform hydrocarbon layer of molecules as an interface between the atmosphere, the liquid, and the adsorbent surface so that, although the film adsorbed on the surface is invisible, there is interposed between the metal surface and the surrounding atmosphere, or contacting liquids, a layer of molecules separating the metal therefrom. If the separatant layer be made hydrophobic, it becomes apparent that water molecules in the air will not reach the metal surface and thereby humid corrosion of the metal can be prevented.

Although the mechanism of the adsorption can thus be easily postulated, the actual physical embodiment of such a process of corrosion protection in a composition for use in a hydraulic system is difficult of accomplishment because of the necessarily varied and empirical nature of the polar compounds, their adsorption characteristics, their solubility in the fluid used in the system, and the generally unfavorable characteristics of adsorption equilibria.

We have found that a group of compounds which belong to the class of amine nitrites and can be represented by the following general formula

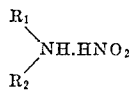

in which $R_1$ and $R_2$ are any alkyl, aryl, alkaryl, or aralkyl organic radicals of which diisopropyl amine nitrite, diisobutyl amine nitrite, and dicyclohexyl amine nitrite are typical, possess characteristics which render them ideally adapted to incorporation into corrosion preventing hydraulic compositions. The compounds of low molecular weight, such as the isobutyl, isopropyl, and cyclohexyl compounds, have relatively high vapor pressures at ambient temperatures, adsorb strongly onto metal surfaces with which they come into contact, and have a sufficient degree of solubility in aqueous organic media to maintain an equilibrium concentration of the amine nitrite vapor in the space above the liquid, so that a protective film can be adsorbed onto the metal enclosing such space. Inasmuch as the solubility of these compounds in aqueous-organic media is limited, adsorption equilibria from dilute solutions of the compounds are sufficiently favorable to leave on the adsorbent surface a substantially complete layer of adsorbed molecules through a wide range of temperatures without danger of re-dissolution of the compound, so that the surface once covered thereby is well protected under a wide variety of conditions. In general, the greater the proportion of the organic constituent in the fluid medium the less soluble the inhibitor and the less that is required.

According to accepted theories of adsorption, when a compound of the nature of a di-substituted amine nitrite, is adsorbed onto a metal surface, the nitrite end of the molecule is the one which is adjacent to the surface and attached thereto. The process of attachment to the surface may or may not include actual chemical reaction of the polar end of the molecule with the metal of the surface. When such perpendicular orientation of the molecules takes place, it is apparent that the hydrocarbon ends of the molecules project out from the surface, thereby interposing between the surface and atmosphere or liquid an interface comprising a complete uniform outer layer of contiguous methyl groups. When such a surface of methyl groups is presented to the atmosphere or to contacting liquid to form an interface, the underlying metal surface is protected by the interposition of the hydrophobic hydrocarbon surface composed entirely of juxtaposed methyl groups.

The method of practicing our invention by embodying it in hydraulic fluids will be more completely understood by reference to the following examples which comprise descriptions of two specific embodiments typifying the hydraulic fluid composition of our invention.

*Example I*

| | |
|---|---:|
| Water_____Parts by wgt__ | 37 |
| Ethylene glycol_____do____ | 49 |
| Ethylene oxide-1,3-propylene oxide copolymer (M. W. 8-15,000) | |
| Parts by wgt___ | 11 |

| | |
|---|---|
| Diethylaminoethanol phosphate Parts by wgt. | 2 |
| Di-isopropyl amine nitrite ____ do ____ | 1.5 |
| Sodium mercaptobenzothiazole __ do ____ | 0.2 |
| pH of composition | 7 to 9 |
| Viscosity at 130° F. _____ centistokes __ | 10 |
| Viscosity at minus 40° F. _____ do ____ (ca.) | 1200 |
| Freezing point, °F. _____ below __ | −50 |

The polymeric thickener used had a viscosity of 70,000 Saybolt Universal seconds at 100° F. and had it been a material of lower viscosity and lower molecular weight, the complete hydraulic fluid could have been adjusted to the proper final viscosity by using a slightly higher proportion. In general the proportion of polymeric thickener will be determined by the viscosity it is desired to impart to the final composition at a given temperature.

A composition having the proportions indicated above was tested in gear pumps. After 100 hours of operation at pressures of 1000 pounds per square inch and sump temperatures of 100° F. it showed no significant change in viscosity, indicating no shear breakdown of the polymeric thickener, and all metal parts in the system were amply protected against corrosion as was shown by no unreasonable loss in weight or significant change in surface appearance.

*Example II*

| | |
|---|---|
| Water _____ Parts by wgt. __ | 37 |
| Ethylene glycol _____ do ____ | 49 |
| Ethylene oxide-1,3-propylene copolymer (M. W. 8–15,000) __ Parts by wgt. __ | 17 |
| Triethylaminoethanol phosphate Parts by wgt. __ | 2 |
| Di-isobutyl amine nitrite _____ do ____ | 1.6 |
| Sodium mercaptobenzothiazole __ do ____ | 0.2 |
| pH of composition | 7 to 9 |
| Viscosity at 130° F. _____ centistokes __ | 10 |
| Viscosity at minus 40° F. _____ do ____ | 1200–1300 |
| Freezing point, ° F. _____ below __ | −50 |

A composition having the proportions indicated above was tested in Pesco gear pumps. After 100 hours of operation at a pressure of 1000 pounds per square inch and a sump temperature of 100° F. it showed no significant change in viscosity, indicating no shear breakdown of the polymeric thickener, and all metal parts in the system were amply protected against corrosion as was shown by the fact that there was no unreasonable loss in weight or significant change in surface appearance.

The hydraulic fluids set forth in the above examples are characterized by their organic nature and constituents which include water, an alcohol or freezing point depressant, and a high molecular weight water-soluble polymer. They are readily varied in composition by varying the nature and proportions of the three principal ingredients. In accomplishing the objects of the invention by varying the nature of the principal ingredients within the scope thereof, the proportions of polyhydric alcohol or freezing point depressant and water should be selected to give a non-inflammable mixture. Such a mixture will have a low but not necessarily the minimum freezing point for the non-inflammability and minimum freezing points of the binary mixtures do not coincide. Once the proportions of depressant and water have been selected, the viscosity of the composition is adjusted by the incorporation of a polymeric thickener which may be any natural or synthetic resin soluble in the water-alcohol mixture throughout the temperature range to which the composition will be exposed. Although these major organic ingredients fix the characteristic physical properties of the fluid, the balancing of its chemical properties, viz., its corrosiveness, pH, and lubricating quality, depends upon the ingredients added in minor amount.

To inhibit the corrosion within the system we have found that generally amines and amine salts, specifically secondary amine nitrites, are of real value. Such compounds as morpholine and substituted morpholines, e. g., ethyl, phenyl, and aminoethyl morpholine, and amine salts such as diisopropyl amine, diisobutyl amine and dicyclohexylamine are valuable anti-corrosion agents because at ambient temperatures they possess sufficiently high vapor pressures to maintain an equilibrium amount of vapor in the open spaces of the hydraulic system and they are of such relatively low solubility in the fluid that the adsorbed film on the metal surfaces of the system is not readily redissolved and the adsorption equilibrium is, therefore, quickly established and not upset.

For example, a satisfactory hydraulic fluid for employment in a simple all-steel or ferrous system can be made by blending water, a freezing point depressant, a thickener, and minor amounts of corrosion inhibiting buffers such as alkali metal phosphates, borax, combinations of phosphate and borax, alkali metal bicarbonates and amine phosphates to inhibit corrosion and buffer the composition. When it is desired to impart vapor phase inhibiting properties to the composition as described in the preceding paragraphs, however, the corrosion inhibiting buffer must be compatible with or match the vapor phase inhibitor. The amine phosphates are preferred in the later instance.

When it is desirable to accomplish inhibition of corrosion of the metals usually occuring in the complex systems commonly found in large-scale installations, copper and copper alloy deactivation become important considerations for copper is almost universally used in hydraulic systems. The retention of vapor phase corrosion inhibition together with liquid phase inhibition then involves the matching of the vapor phase inhibitor with copper deactivating compounds and the buffering agents as represented by the examples given above. That is, the vapor phase inhibitor, the copper deactivator, and the buffer, in combination, inhibit vapor phase corrosion, liquid phase corrosion and maintain the pH of the fluid in a safe range. Thiazoles and substituted thiazole salts such as the alkali metal mercaptabenzothiazoles are useful with amine salts and alkanol amine phosphates to obtain this combination of properties.

The alkanol amine phosphates are added to impart a given amount of corrosion inhibition to the fluid but are also used for the reason that they are generically related to the amine corrosion inhibitors and maintain the fluid buffered at a pH of about 7 to 9. It is not advisable to permit the fluid to become strongly acid because it will then decompose amine salts and its becoming strongly alkaline is to be avoided because it will decompose nitrite to amine. Accordingly by employment of alkanol amine phosphates, the mono-, di-, and tri-compounds, corrosion inhibition is aided and the solution is buffered to a pH in the safe range of about 7 to 9.

Hydraulic fluids having compositions corresponding to those in the examples and many variations thereof were tested for their inflammability by various means such as flash points and spontaneous ignition temperature determinations, incendiary bullet tests and spray inflammability tests. In all cases it was found that ignition was impossible or that ignition when it occurred was started with extreme difficulty and then not until a large part of the water had been removed. Accordingly, the compositions were considered substantially non-inflammable.

It is apparent, therefore, that many widely different embodiments of this invention can be made without departing from the spirit of scope thereof and, accordingly, it is to be understood that we do not limit ourselves to the specific embodiments thereof except as defined in the appended claims.

The invention described herein may be manufactured and used by or for the Government of the United States of America for governmental purposes without the payment of any royalties thereon or therefore.

Having described our invention what we claim as new and desire to secure by Letters Patent of the United States is:

1. An hydraulic fluid consisting essentially of water and a water miscible compound selected from the group consisting of glycols and glycol ethers having from 2 to 14 carbon atoms in proportions resulting in a non-inflammable mixture of a substantially minimum freezing point and, as a soluble thickener, from about 5 to 20% by weight of a high molecular weight viscous copolymer of ethylene oxide and 1,2-propylene oxide copolymerized in the proportion of from more than one mol to three mols of the former to one mol of the latter and having a molecular weight of less than 20,000.

2. An hydraulic fluid consisting essentially of water and ethylene glycol in proportions resulting in a non-inflammable mixture of a substantially minimum freezing point and, as a soluble thickener, from about 5 to 20% by weight of a high molecular weight viscous copolymer of ethylene oxide and 1,2-propylene oxide copolymerized in the proportion of from more than one mol to three mols of the former to one mol of the latter and having a molecular weight of less than 20,000.

3. An hydraulic fluid consisting essentially of water and ethylene glycol in proportions resulting in a non-inflammable mixture of a substantially minimum freezing point and, as a soluble thickener, from about 5 to 20% by weight of a high molecular weight viscous copolymer of ethylene oxide and 1,2-propylene oxide copolymerized in the proportion of three mols of the former to one mol of the latter and having a molecular weight of less than 20,000.

4. An hydraulic fluid consisting essentially of water and ethylene glycol in proportions resulting in a non-inflammable mixture of a substantially minimum freezing point, a small but corrosion inhibiting amount of a dialkyl amine nitrite, a small amount of a soluble alkanol amine phosphate sufficient to buffer the fluid within the pH range of about 7 to 9 and, as a soluble thickener, from about 5 to 20% by weight of a high molecular weight viscous copolymer of ethylene oxide and 1,2-propylene oxide copolymerized in the proportion of from more than one mol to three mols of the former to one mol of the latter and having a molecular weight of less than 20,000.

5. An hydraulic fluid consisting essentially of, by weight, about 35% water, about 50% ethylene glycol and, as a soluble thickener, from about 5 to 20% of a high molecular weight viscous copolymer of ethylene oxide and 1,2-propylene oxide copolymerized in the proportion of from more than one mol to three mols of the former to one mol of the latter and having a molecular weight of less than 20,000.

WILLIAM A. ZISMAN.
JOHN K. WOLFE.
HAYWARD R. BAKER.
DWIGHT R. SPESSARD.

REFERENCES CITED

The following references are of record in the file of this patent:

UNITED STATES PATENTS

| Number | Name | Date |
| --- | --- | --- |
| 1,823,216 | Smith | Sept. 15, 1931 |
| 2,058,899 | Matheson | Oct. 27, 1936 |
| 2,091,627 | Bruson | Aug. 31, 1937 |
| 2,197,775 | Whaley | Apr. 23, 1940 |
| 2,236,662 | Wright | Apr. 1, 1941 |
| 2,238,045 | Fulton | Apr. 15, 1941 |
| 2,416,734 | Boggs et al. | Mar. 4, 1947 |
| 2,419,327 | Wachter et al. | Apr. 22, 1947 |
| 2,425,755 | Roberts et al. | Aug. 19, 1947 |
| 2,425,845 | Toussaint et al. | Aug. 19, 1947 |
| 2,451,523 | Walb | Oct. 19, 1948 |
| 2,455,961 | Walker | Dec. 14, 1948 |
| 2,467,177 | Zimmer | Apr. 12, 1949 |